United States Patent
La Camera et al.

(10) Patent No.: US 12,482,450 B2
(45) Date of Patent: Nov. 25, 2025

(54) IDENTIFIER SHORTENING FOR NARRATION MEDIA ITEMS

(71) Applicant: Spotify AB, Stockholm (SE)

(72) Inventors: Paolo La Camera, Hoeilaart (BE); Erik Johan Curcio Lindström, Stockholm (SE)

(73) Assignee: Spotify AB, Stockholm (SE)

( * ) Notice: Subject to any disclaimer, the term of this patent is extended or adjusted under 35 U.S.C. 154(b) by 253 days.

(21) Appl. No.: 18/474,090

(22) Filed: Sep. 25, 2023

(65) Prior Publication Data

US 2025/0104690 A1    Mar. 27, 2025

(51) Int. Cl.
*G06F 16/48* (2019.01)
*G06F 16/638* (2019.01)
*G10L 13/027* (2013.01)

(52) U.S. Cl.
CPC .......... *G10L 13/027* (2013.01); *G06F 16/639* (2019.01)

(58) Field of Classification Search
CPC ....... G10L 13/02; G10L 13/033; G06F 16/48; G06F 16/639
See application file for complete search history.

(56) References Cited

U.S. PATENT DOCUMENTS

| | | |
|---|---|---|
| 2003/0158736 A1 | 8/2003 | James et al. |
| 2007/0201631 A1 | 8/2007 | Cave et al. |
| 2014/0122567 A1 | 5/2014 | Suryavanshi |
| 2015/0221000 A1* | 8/2015 | Cohen-Martin ....... G06Q 30/02 705/14.73 |
| 2015/0371679 A1* | 12/2015 | Oz .......................... H04N 5/76 386/285 |
| 2017/0134356 A1 | 5/2017 | Oyman |
| 2017/0249934 A1 | 8/2017 | Kang et al. |
| 2019/0043492 A1 | 2/2019 | Lang |
| 2019/0311005 A1* | 10/2019 | Beckhardt ............... G06F 16/68 |
| 2020/0159761 A1 | 5/2020 | Mennicken et al. |
| 2021/0233534 A1 | 7/2021 | Nadig et al. |
| 2021/0360334 A1 | 11/2021 | Kuenhl et al. |
| 2023/0224303 A1 | 7/2023 | Sviri et al. |
| 2024/0412720 A1* | 12/2024 | Vasylyev .......... G06F 16/90332 |

FOREIGN PATENT DOCUMENTS

WO    WO 02/037310    5/2002

OTHER PUBLICATIONS

"Spotify Debuts a New AI DJ, Right in Your Pocket", Feb. 22, 2023, https://newsroom.spotify.com/stream-on-2023, 6 pages.
Extended European Search Report from Application No. 24202464.4, dated Jan. 24, 2025.

* cited by examiner

*Primary Examiner* — Jakieda R Jackson
(74) *Attorney, Agent, or Firm* — McDonnell Boehnen Hulbert & Berghoff LLP (57) ABSTRACT

A method and system for generating synthesized speech is disclosed. The method includes receiving a request to play a sequence of media items. The sequence of media items may include a media track and a narration media item that relates to the media track. The method further comprises generating a media item identifier for the narration media item. Based on compatibility information of a media playback device, the method includes providing the media item identifier to a shortening service. The shortening service may generate a shortened media item identifier that is provided to the media playback device. The shortened media item identifier may be used by the media playback device to retrieve a synthesized speech track for the narration media item.

20 Claims, 7 Drawing Sheets

IDENTIFIER SHORTENING FOR NARRATION MEDIA ITEMS

BACKGROUND

For a digital media service provider, there may be various challenges related to facilitating playback of a sequence of media items. For example, there may be challenges related to selecting the media items to play. In some instances, manners for identifying media items may be used that reduce the need to transfer media content itself. However, some computing devices may not be configured to handle identifiers with a certain size or format. Such challenges may be exacerbated in a distributed computing environment in which device hardware and software may vary from one device to the next. Furthermore, there may be additional challenges when facilitating a playback of a sequence of media items if the types of media content vary or if the content of one or more of the media items depends on the content of another one or more of the media items.

SUMMARY

In general terms, aspects of the present disclosure relate to a method that receives a request to play a sequence of media items. The sequence of media items may include a media track and a narration media item that relates to the media track. Based on compatibility information of a media playback device, the method may include providing a media item identifier for the narration media item to a shortening service. The shortening service may generate a shortened media item identifier that is provided to the media playback device. The shortened media item identifier may be used by the media playback device to retrieve a synthesized speech track for the narration media item.

In a first aspect, a method of generating synthesized speech is disclosed. The method comprises receiving a playback request from a media controller device; identifying a plurality of media items for playback in response to the playback request, the plurality of media items including at least a media track and a narration media item associated with the media track; determining a media item identifier for the narration media item, the media item identifier having a length; determining compatibility information for a media playback device; using the compatibility information, determining whether the media playback device is compatible with the media item identifier; in response to determining that the media playback device is not compatible with the media item identifier, sending the media item identifier to a shortening service to generate a shortened media item identifier that has a length that is shorter than the length of the media item identifier; sending the shortened media item identifier to the media playback device; at the shortening service, receiving a parameter of the shortened media item identifier from the media playback device; at the shortening service, retrieving the media item identifier using the parameter of the shortened media item identifier; providing, from the shortening service, the media item identifier to the media playback device; and using the media item identifier, requesting, from the media playback device, a synthesized speech track for playback of the narration media item.

In a second aspect, a system for generating synthesized speech is disclosed. The system comprises a media playback device; a playback manager; a DJ sequence provider; and a shortening service; wherein the playback manager is configured to receive a playback request including a playlist identifier and compatibility information of the media playback device; wherein the DJ sequence provider is configured to, based in part on the playlist identifier, identify a plurality of media items for playback including at least a media track and a narration media item associated with the media track; wherein the playback manager is further configured to: determine a media item identifier for the narration media item, the media item identifier having a length; using the compatibility information, determine whether the media playback device is compatible with the media item identifier; in response to determining that the media playback device is not compatible with the media item identifier, send the media item identifier to the shortening service to generate a shortened media item identifier that has a length that is shorter than the length of the media item identifier; and send the shortened media item identifier to the media playback device; wherein the shortening service is configured to: receive a parameter of the shortened media item identifier from the media playback device; retrieve the media item identifier using the parameter of the shortened media item identifier; and provide the media item identifier to the media playback device; wherein the media playback device is configured to request, using the media item identifier a synthesized speech track for playback of the narration media item.

In a third aspect, a platform for facilitating playback of a narration media item and a media track is disclosed. The platform comprises a processor; and memory, the memory storing instructions that, when executed by the processor, cause the platform to: receive a playback request from a media controller device, the playback request including a playlist identifier and compatibility information of a media playback device; identify a plurality of media items for playback in response to the playback request, the plurality of media items including at least the media track and the narration media item associated with the media track; determine a media item identifier for the narration media item, the media item identifier having a length; use the compatibility information, determine whether the media playback device is compatible with the media item identifier; in response to determining that the media playback device is not compatible with the media item identifier, send the media item identifier to a shortening service to generate a shortened media item identifier that has a length that is shorter than the length of the media item identifier; send the shortened media item identifier to the media playback device; receive a parameter of the shortened media item identifier from the media playback device; retrieve the media item identifier using the parameter of the shortened media item identifier; and provide the media item identifier to the media playback device.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
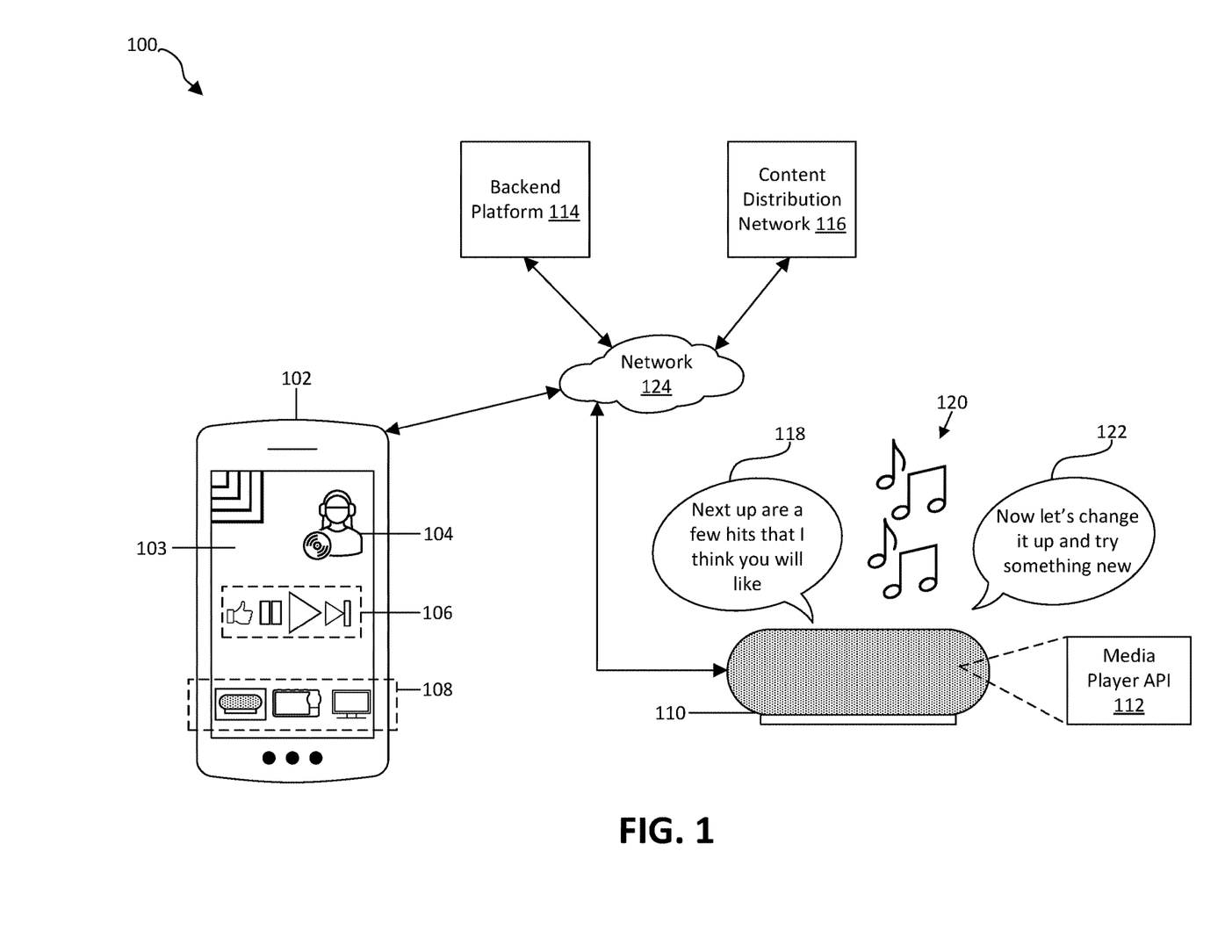
FIG. 1 illustrates an example network environment in which aspects of the present disclosure may be implemented.

FIG. 1 illustrates an example network environment 100 that includes components for facilitating the playback of a sequence of media items. Depending on the embodiment, the components of the environment 100 may vary, and there may be more or fewer components than those illustrated in FIG. 1. Furthermore, one or more of the components may include a plurality of subcomponents. In the example of FIG. 1, The environment 100 includes a controller device 102, a media playback device 110, a backend platform 114, a content distribution network (CDN) 116, and a network 124. Example operations of components of the environment 100 are illustrated and described below in connection with FIG. 2.

The controller device 102 may be a computing device, such as a smartphone, a desktop or laptop computer, a smart watch, a smart television, a smart speaker, or another computing device. The controller device 102 may be remote from the backend platform 114 and the content distribution network 116. For example, the controller device 102 may access the backend platform 114 and the content distribution network 116 over the internet. In some embodiments, the controller device 102 may not be remote from the media playback device 110. For example, the controller device 102 and the media playback device 110 may be connected to a common router or may be connected to one another via Bluetooth, Thread, or another communication protocol. Furthermore, in some instances, the controller device 102 and the media playback device 110 may be the same device. In other embodiments, the controller device 102 and the media playback device 110 may be remote from one another and may be coupled with one another via the internet. The controller device 102 may include a client application 103 that is installed on the controller device 102 or that is accessible by a program (e.g., a web browser) installed on the controller device.

The client application 103 may be an application that allows a user of the controller device 102 to submit a request to play a sequence of media items. The client application 103 may be a client-side application of a distributed digital media service and may be coupled with a server-side application that is integrated with the backend platform 114 and the CDN 116. Depending on the characteristics of the controller device 102, characteristics of the client application 103 may vary. For example, the client application 103 may be a mobile application, a web browser, firmware, or another application. In some embodiments, the client application 103 is developed by—or otherwise associated with— an entity (such as a media service provider) that develops or controls the backend platform 114 and the content distribution network 116. In the example of FIG. 1, the client application 103 includes a plurality of features, including a DJ feature 104, control options 106, and playback casting options 108.

The DJ feature 104 may facilitate the selection, generation, and playback of a sequence of media items. The sequence of media items may include, for example, a narration media item. A narration media item may include text or audio that relates to one or more of the other media items in the sequence of media items. For example, the sequence of media items may include a media track (e.g., a music track or another audio track) and a narration of the media track (e.g., an audio narration that references the music track). As another example, the sequence of media items may include an audio-visual item, and the narration may be an image that references the audio-visual item.

In some embodiments, a user of the client application 103 may select an option in a display of the client application 103 to use the DJ feature 104. In some embodiments, a user may provide a voice query to use the DJ feature 104 (e.g., "Hey Computer, play DJ"). The DJ feature 104 may include components from one or more of the controller device 102, the media playback device 110, the backend platform 114, and the content distribution network 116. Example outputs of the DJ feature 104 are illustrated by the elements 118-122. Aspects of the DJ feature are further described below in connection with FIGS. 2-7.

The control options 106 enable a user of the client application 103 to control playback of media items, such as media items of a sequence of media items associated with the DJ feature 104. In the example shown, the control options 106 include a like option, a stop option, a play option, and a skip option. Other options are also possible, such as a return option, an option to change playback speed, an option to download a media item, or an option to set a parameter for the DJ feature 104 (e.g., selecting a voice for the DJ, selecting an amount of speech provided by the DJ, indicating a type of media item that the DJ is to select, such as genre, or altering another parameter of the DJ).

The playback casting options 108 include one or more options representing devices to which a user of the client application 103 may cast media playback. In the example shown, the playback casting options 108 include the media playback device 110. In the client application 103, a user may select an icon representing the media playback device 110 and may thereby cause media content to play on the media playback device. For example, the user may cause the sequence of media items associated with the DJ feature 104 to be played by the media playback device 110. In some embodiments, a user may not use the playback casting options 108 and instead may play media content using the device 102.

The media playback device 110 may be a computing device configured to play media content. In some embodiments, the media playback device 110 is a smart device, such as a smart speaker. In some embodiments, the media playback device 110 is the same device as the controller device 102. In some embodiments, the media playback device 110 includes a client application that may be communicatively coupled with one or more of the backend platform 114 or the content distribution network 116. The client application on the media playback device 110 may be a different instance of the client application 103, it may be a variation of the client application 103, or it may be distinct from the client application 103. In some embodiments, the client application on the media playback device 110 is installed as part of manufacturing the media playback device 110. In some embodiments, the client application on the media playback device 110 may include a media player application programming interface (API) 112.

The media player API 112 may be one or more functions for playing media content. In examples, the media player API 112 is called to play media content on the media playback device 110. For example, the media player API 112 may be a rendering stack that is embedded in the media playback device 110. In some embodiments, the media player API 112 is defined to receive a media item identifier for a media item, such as a uniform resource identifier (URI) or a uniform resource locator (URL). The media player API 112 may be configured to use the media item identifier to retrieve media content from the CDN 116. The media content may be a stream of data that represents the media item and that can be played by the media playback device 110. The media content may be a media file, the format of which may vary depending on the type of media (e.g., audio, visual, audio-visual, etc.) or depending on the characteristics of the media playback device 110.

The media player API 112 may, in some embodiments, have limitations. For example, the media player API 112 may be unable to process certain media item identifiers. In some embodiments, the media playback device 110 may have limited computational resources (e.g., run-time memory, storage, or processing power), and as a result, inputs to the media player API 112 may be restricted. In some embodiments, the media player API 112 is a legacy program that is difficult to update or cannot be updated. In some embodiments, the media player API 112 is configured to receive a media item identifier that is less than or equal to 256 bytes. For example, if the media item identifier is a URL, then the URL must be less than or equal to 256 bytes. In some embodiments, the media player API 112 may be configured to only process media item identifiers with a pre-defined format.

The backend platform 114 may be a collection of software, hardware, and networks. Among other things, the backend platform 114 may be configured to receive a request to play a sequence of media items. For example, a user may submit a request via the client application 103 to use the DJ feature 104, and the request may be converted into a request to play a sequence of media items that includes at least one narration of another media item. In some embodiments, the request to play a sequence of media items may be associated with a request to play a playlist and therefore may include a playlist identifier. In some embodiments, the request may include information about the media playback device that is to play the sequence of media items (e.g., the media playback device 110). Such information may include capabilities of the media playback device 110, such as file types that can be played by the media playback device 110 or whether the media player API 112 on the media playback device 110 has any restrictions or limitations. Among other things, the backend platform 114 may determine a sequence of media items to play and determine media item identifiers for each of the media items in the sequence of media items, an example of which is illustrated and described in connection with FIG. 3.

In some embodiments, the backend platform 114 may provide the media item identifiers to the media playback device 110. At the media playback device 110, the media item identifiers may be used by the media player API 112 to play or render media content associated with the media item identifiers. Because the media player API 112 may, in some instances, have limitations regarding the size and format of its inputs, the backend platform 114 may, in some embodiments, include a proxy service for deriving a media item identifier that is usable by the media player API 112 and then provide the usable media item identifier to the media playback device 110. An example of such a proxy service is the shortening service 258, which is further described below in connection with FIGS. 5-6, and which is configured to shorten a media item identifier so that it is usable by the media player API 112.

The content distribution network (CDN) 116 may be a collection of servers and databases. The servers may include endpoints to receive calls from programs requesting content (such as the media player API 112). In some embodiments, the endpoints may retrieve, in response to receiving a request, the requested content from databases (e.g., a cache or another storage system) and return the requested content to the calling program. In some embodiments, the CDN 116 may stream media content to calling programs. In some embodiments, the CDN 116 may make media content files available to download by calling programs.

In some embodiments, the CDN 116 may include—or be communicatively coupled with—a media content generator. The media content generator may be, for example, a text generator, a speech generator, or an image generator. In some embodiments, the media content generator includes a generative artificial intelligence model (e.g., a deep neural network configured to output one or more of text, speech, or visual information). In some embodiments, the CDN 116 may receive a request from a calling program and may use the media content generator to generate a response. An example of a media content generator may be the text-to-speech generator 272 of FIG. 5. In some embodiments, the CDN 116 is part of the backend platform 114 or is communicatively coupled with components of the backend platform 114.

The elements 118-122 illustrate example outputs of the media playback device 110. In some embodiments, each of the elements 118-122 may be output by the media playback device 110 following a call to the media player API 112. In some embodiments, the elements 118-122 correspond with a sequence of media items associated with the DJ feature 104. For example, the elements 118 and 122 may be narrations of the media content 120. The media content 120 may include one or more media items played by the media playback device. The media content 120 may include, for example, music, podcasts, audio books, or another type of audio content. Furthermore, in some embodiments, the media content 120 may include images or audio-visual content.

The network 124 may be, for example, a wireless network, a virtual network, the internet, or another type of network. Additionally, the network 124 may be divided into subnetworks, and the subnetworks may be different types of networks.

Figure 2:
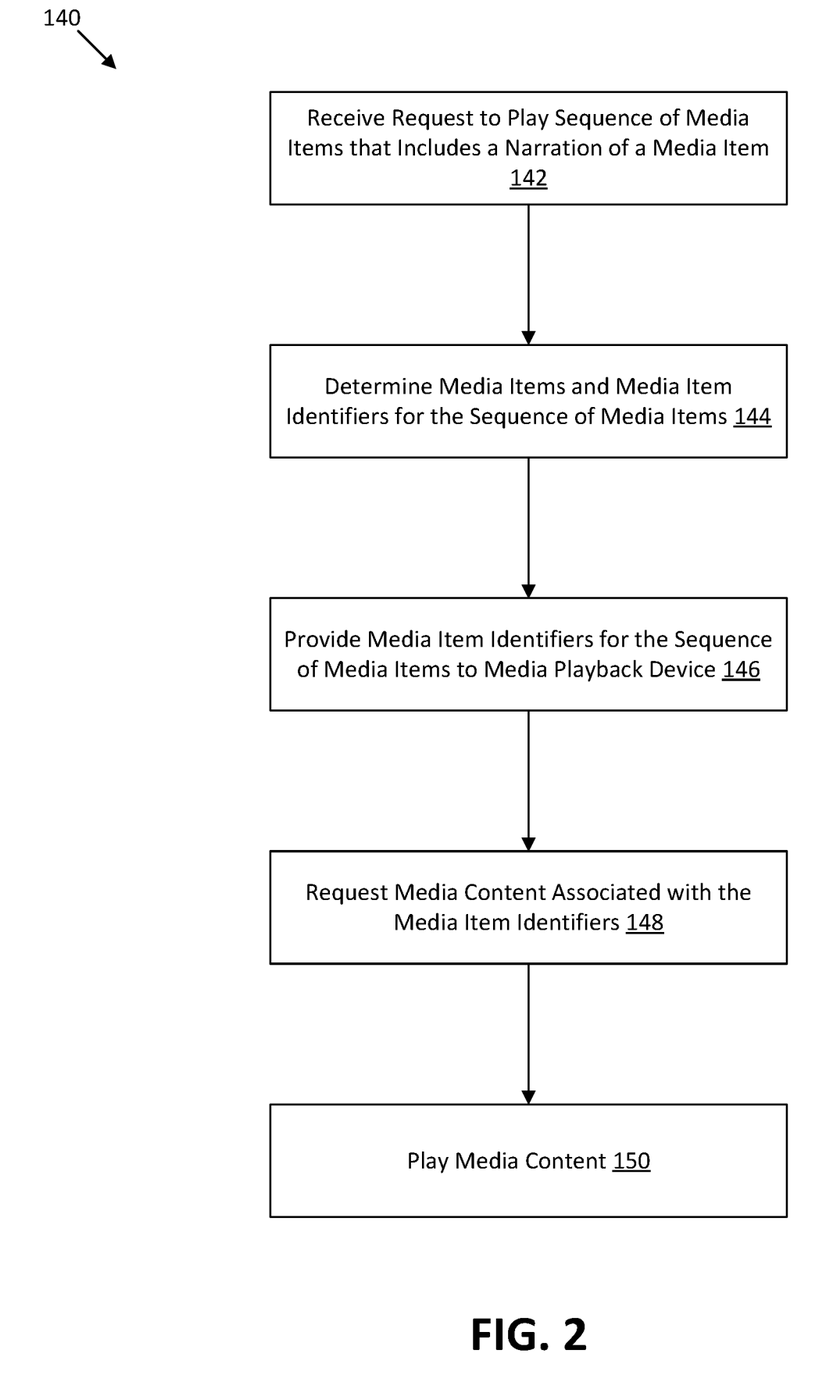
FIG. 2 is a flowchart of an example method for facilitating playback of a sequence of media items.

FIG. 2 is a flowchart of an example method 140 for facilitating the playing of a sequence of media items. Operations of the method 140 are described as being performed by components of FIG. 1. However, depending on the embodiment, the component performing an operation may vary and an operation may be performed by a different component than described herein.

At operation 142, the backend platform 114 may receive a request to play a sequence of media items. In some embodiments, the request to play a sequence of media items is part of the DJ feature 104. For example, the client application 103 may submit a request to use the DJ feature 104 and the request may be converted (e.g., at the client application 103 or by a component of the backend platform 114) into a request to play a sequence of media items that includes a narration of one of the media items. In some embodiments, the request to play a sequence of media items is a request to play a playlist and may include a playlist identifier that is later mapped to a request to use the DJ feature 104, as is further described in connection with FIG. 3. In some embodiments, the request may be for a sequence of media items that may not relate to the DJ feature 104.

The request to play a sequence of media items may include various information. For example, the request may include an identifier of a user that sent the request. Based in part on the identifier, the backend platform 114 may select one or more recommended items to include in the sequence of media items. As another example, the request may include an indication of a type of media item requested. For instance, the user may provide a request to play a predefined playlist of songs, or the user may provide a request for songs with certain musical characteristics, such as songs belonging to a particular genre.

In some embodiments, the request may include information about a media playback device that is to play the sequence of media items. From such information, the backend platform 114 may determine compatibility information for the media playback device. For example, the request may include information about the device's speakers, whether the device includes a screen, the available run-time memory and disk storage on the device, network connectivity strength of the device, a software version of an application on the device, or other information about the device. As another example, the request may include contextual information, such as a location of the media playback device or a time or date at which the request was submitted. As another example, the request may include one or more parameters related to the DJ feature 104, such as a frequency of narrations output by the DJ, a length of narrations output by the DJ, a mood of narrations or selected media items by the DJ, or a voice of the DJ.

At operation 144, the backend platform 114 may determine media items for the sequence of media items and media item identifiers for the media items in the sequence of media items. For example, in response to receiving the request, the backend platform 114 may select one or more media items to include in the sequence of media items. To do so, the backend platform 114 may, in some embodiments, use information provided in the request. For example, the backend platform 114 may identify a user that sent the request and then use a recommendation engine to select media items based in part on the user's preferences. Furthermore, the backend platform 114 may include different types of media content in the sequence of media items. For example, the backend platform 114 may select a plurality of music items and one or more narration media items that relate to the plurality of music items. In some embodiments, the narration media items include text that relate to the plurality of music items, and the text may be converted to speech that may be output by a media playback device. In some embodiments, a narration can be an image or an audio-visual media item.

As part of determining the media items for the sequence of media items, the backend platform 114 may generate or retrieve a media item identifier for each of the media items in the sequence of media items. In some embodiments, the media item identifier is an alphanumeric string that includes information about the media item or that, when used, enables a program to access information about the media item. For example, the media item identifier may include encoded information about the media item that may be decoded by a component of the backend platform 114 or the media player API 112.

In some embodiments, the media item identifier corresponds to a location of the media item and may be, for example, a uniform resource identifier (URI) or uniform resource locator (URL). In some embodiments, a media item may be associated with a plurality of identifiers. For example, in some embodiments, a media item may be associated with a media item identifier that is a string used as a key to lookup data for a media item in a database. As another example, a media item identifier may itself be descriptive of characteristics of the media item (e.g., the media item identifier may include a name, genre, musical characteristics, or a hashed or encoded representation of such data). In some embodiments, various components of the backend platform 114 may be involved in selecting media items for the sequence of media items and in determining identifiers for the selected media items, as illustrated and described below in connection with the example of FIG. 3.

At operation 146, the backend platform 114 may provide the media item identifiers for the sequence of media items to the media playback device 110. In some embodiments, the backend platform 114 may control the timing at which the media items are played by the media playback device 110. In such embodiments, the backend platform 114 may provide a media item identifier to the media playback device 110 based on the time that the media item is to be retrieved and played by the media playback device 110.

At operation 148, the media playback device 110 may request media content associated with the media content identifiers. To do so, the media playback device 110 may use the media player API 112. For example, the media playback device 110 may, for a media item, provide a media item identifier to the media player API 112, which may use the media item identifier to request media content from the CDN 116. The CDN 116 may retrieve or generate the media content and return it to the media playback device 110.

In some embodiments, the media playback device 110 may request media content for a media item in response to determining that it is time to play the media item. In some embodiments, the media playback device 110 may pre-fetch media content by requesting media content for a media item prior to a time that the media item is to be played. In some embodiments, the media playback device 110 may concurrently request media content for a plurality of media items. For the case in which the media item identifier may be a URL, the media player API 112 may use the URL to request media content. For example, the media player API 112 may submit an HTTP GET request to the URL. As described below in connection with FIGS. 5-7, requesting the media content using the URL may include following a shortened URL to a shortening service, receiving an HTTP redirect, and following a longer URL to retrieve the media content.

For a media item that is a narration, the media playback device 110 may retrieve a synthesized speech track of the narration's text, as described below in connection with FIG. 5. The synthesized speech track may be played by the media playback device for the narration media item.

At operation 150, the media playback device 110 may play media content. This may be facilitated by the media player API 112 in some examples. In some embodiments, the CDN 116 may stream the media content to the media playback device 110, and the media playback device 110 may play the media content as it is received. As another example, the media playback device 110 may receive a media file from the CDN 116 and, in response to determining that the media item is to be played, play the media file.

Figure 3:
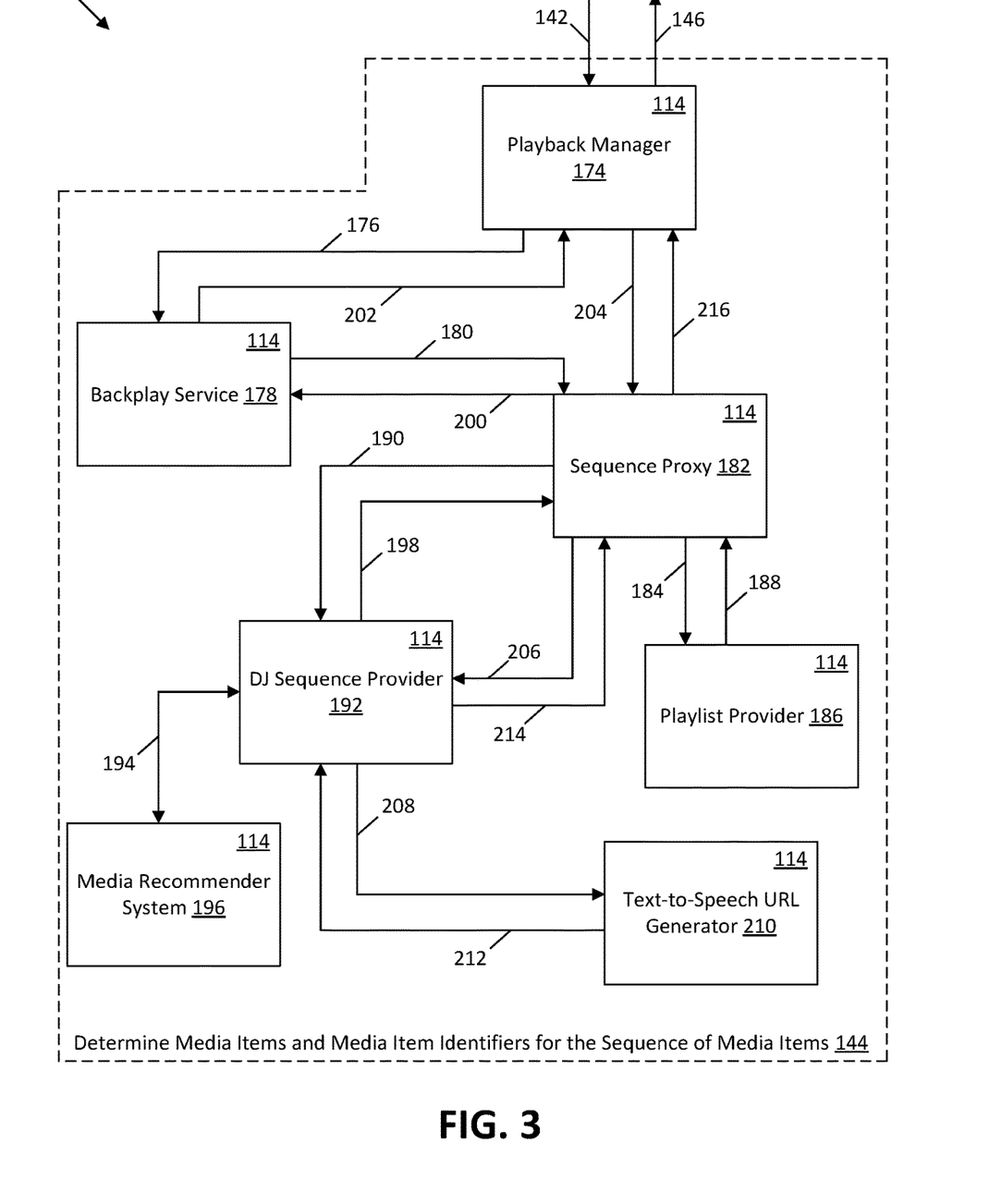
FIG. 3 is a flowchart for performing aspects of selecting media items and determining media item identifiers.

FIG. 3 is flowchart of an example method 172 for performing aspects of determining media items and media item identifiers for the sequence of media items (operation 144 of FIG. 2). Furthermore, FIG. 3 illustrates an example architecture of components of the backend platform 114. In the example shown, the backend platform 114 includes a playback manager 174, a backplay service 178, a sequence proxy 182, a playlist provider 186, a DJ sequence provider 192, a media recommender system 196, and a text-to-speech URL generator 210. In some embodiments, at least some components illustrated in FIG. 3 may not be part of the backend platform 114, but rather may be part of a client device or a client-side application. For example, in some embodiments, one or more of the playback manager 174 or the backplay service 178 may be part of a client device or client application. For example, when the client is a smartphone or a computer communicatively coupled with the backend platform 114, then the playback manager 174 or the backplay service 178 may be part of a client-side application.

The playback manager 174 may be an interface for interacting with client devices. In some embodiments, the playback manager 174 may receive requests from client devices and may provide data to client devices so that the client devices may play media files. In some embodiments, the playback manager 174 may control the timing of playing media items. For example, the playback manager 174 may, in some instances, provide a media item identifier to a client device only after determining that it is time to play the media item.

In the example shown, the playback manager 174 may receive, at the operation 142, a request to play a sequence of media items that includes a narration media item related to one or more of the other media items. In some embodiments, upon receiving the playback request, the playback manager 174 may map the request to a context identifier, which may be a command or identifier that may be processed by other components of the backend platform 114. If the playback request relates to the DJ feature 104, then the playback manager 174 may map the request to a context identifier associated with the DJ feature 104. In some embodiments, the context identifier is associated with a playlist. In some embodiments, the request is mapped to the context identifier prior to being received by the playback manager 174, and the context identifier may be opaque to the playback manager 174.

At operation 176, the playback manager 174 may provide the context identifier to the backplay service 178. The playback manager 174 may further provide a command to the backplay service 178 to convert the context identifier into a sequence of media item identifiers corresponding to media items that are to be played.

The backplay service 178 may be a service that applies business logic in the backend platform 114. The backplay service 178 may be configured to receive commands from the playback manager 174 and to return a sequence of media items (or media item identifiers) to the playback manager 174. The context identifier received from the playback manager 174 may be opaque to the backplay service 178. To resolve it into a list of playable media items, the backplay service may provide the context identifier to the sequence proxy 182.

At operation 180, the backplay service 178 may provide the context identifier to the sequence proxy 182.

The sequence proxy 182 may interface with the playback manager 174 and the backplay service 178 and facilitate the resolution of context identifiers into playable media items. Furthermore, the sequence proxy 182 may be a router that, based on the content of the context identifier, selects a backend component for resolving the context identifier. For example, the sequence proxy 182 may include a routing table that maps the context identifier to a backend component configured to resolve the context identifier. In some embodiments, the sequence proxy 182 inspects only a part (e.g., a prefix) of the context identifier to select a backend component. In the example of FIG. 3, the sequence proxy 182 may determine that the context identifier received form the backplay service 178 relates to a playlist (e.g., a sequence of media items), and the sequence proxy 182 may select the playlist provider 186 as the component to which to route the context identifier.

At operation 184, the sequence proxy 182 may provide the context identifier to the playlist provider 186.

The playlist provider 186 may be configured to receive context identifiers for a plurality of playlist types. In some embodiments, the playlist types may include, for example, a playlist that includes a narration (e.g., a playlist associated with the DJ feature 104), a user-defined playlist, an editorial playlist, or a user-specific recommended playlist. In some embodiments, the playlist provider 186 may be configured to resolve the context identifier and return a sequence of media item identifiers to the sequence proxy 182. In the example shown, however, the playlist provider 186 may inspect the context identifier and determine that it relates to the DJ feature 104, which the playlist provider 186 may not be configured to directly resolve. Based in part on the context identifier, the playlist provider 186 may generate a DJ-specific context identifier.

At operation 188, the playlist provider 186 may provide the DJ-specific context identifier to the sequence proxy 182. The sequence proxy 182 may inspect the DJ-specific context identifier and, based on a routing table, select the DJ sequence provider 192 to resolve the DJ-specific context identifier. In some embodiments, rather than receiving the DJ-specific context identifier from the playlist provider 186, the sequence proxy 182 may receive the DJ-specific context identifier from the backplay service 178, and then provide it to the DJ sequence provider 192, thereby eliminating the use of the playlist provider 186 as part of resolving requests to use the DJ feature 104.

At operation 190, the sequence proxy 182 may provide the DJ-specific context identifier to the DJ sequence provider 192.

The DJ sequence provider 192 may be configured to generate a sequence of media items. The sequence of media items may include different types of media items. For example, the media items may include one or more audio tracks (e.g., songs) and one or more narrations about the audio tracks. In some embodiments, the DJ sequence provider is used specifically to generate a sequence of media items to play for the DJ feature 104. As an example, in response to a request to use the DJ feature 104, the DJ sequence provider 192 may generate an introduction narration followed by three to five audio items followed by an outro narration. Other permutations are also possible, such as including more or fewer narrations, including more or fewer audio items, or changing the order of narrations and audio items.

At operation 194, the DJ sequence provider 192 may select some media items to include in the sequence of media items. To do so, the DJ sequence provider 192 may use the media recommender system 196. For example, the DJ sequence provider 192 may receive information related to the user, controller device or media playback device, or context of the request. The DJ sequence provider 192 may select some of that information and provide it to the recommender system 196. The DJ sequence provider 192 may further include other information in the request, such as a number of media items to recommend. In the example shown, the media recommender system 196 may return one or more media item identifiers to the DJ sequence provider 192.

For each narration, the DJ sequence provider 192 may generate text. To do so, the DJ sequence provider 192 may, in some embodiments, use information related to the media items returned by the media recommender system 196 or use information received from a client device as part of a request to use the DJ feature 104. In some embodiments, the DJ sequence provider 192 may use a generative language model to generate a narration. For example, the DJ sequence provider 192 may input a prompt and one or more of data related to the recommended items or the request data to a generative language model. The prompt may include a request to generate a narration. The language model may output the narration. In some embodiments, the DJ sequence provider 192 may use one or more predefined templates to generate text for narrations. In some embodiments, to generate a narration, the DJ sequence provider 192 may consider a place of the narration within the ordered sequence of the plurality of media items (e.g., whether the narration is the first item, whether the narration is in the middle of the sequence of items, or whether the narration is at the end). In some embodiments, to generate a narration, the DJ sequence provider 192 may only consider the media items that are before and after the narration in the sequence of media items.

After determining the narration text, the DJ sequence provider 192 may, in some embodiments, encode the narration text and include the encoded narration text as part of an identifier for the narration media item. The DJ sequence provider 192 may then assemble a sequence of identifiers for the sequence of media items. Some of the media item identifiers (e.g., for recommended media items) may be based on data received from the media recommender system, whereas some of the media item identifiers (e.g., for narrations) may be generated by the DJ sequence provider 192 after determining text for the narrations.

At operation 198, the DJ sequence provider may provide the sequence of media item identifiers for the requested sequence of media items to the sequence proxy 182.

At operation 200, the sequence proxy 182 may provide the sequence of media item identifiers to the backplay service 178. In some embodiments, the backplay service 178 may convert the sequence of media items into a structured data format (e.g., a state machine) that can be used by the playback manager 174.

At operation 202, the backplay service provides the sequence of media item identifiers to the playback manager 174. In some embodiments, the playback manager 174 may determine whether a client device (e.g., the media player API 112) is configured to resolve (e.g., play or retrieve media content to play) each of the media item identifiers of the sequence of media item identifiers. In some embodiments, the playback manager 174 determines that the media item identifiers for the narration media items (e.g., which may include encoded narration text) cannot be resolved by a downstream system, such as a client device or the media player API 112. As a result, the playback manager 174 may request that the sequence proxy 182 convert the media item identifiers for the narration media items into data that can be handled by a downstream system.

Figure 4:
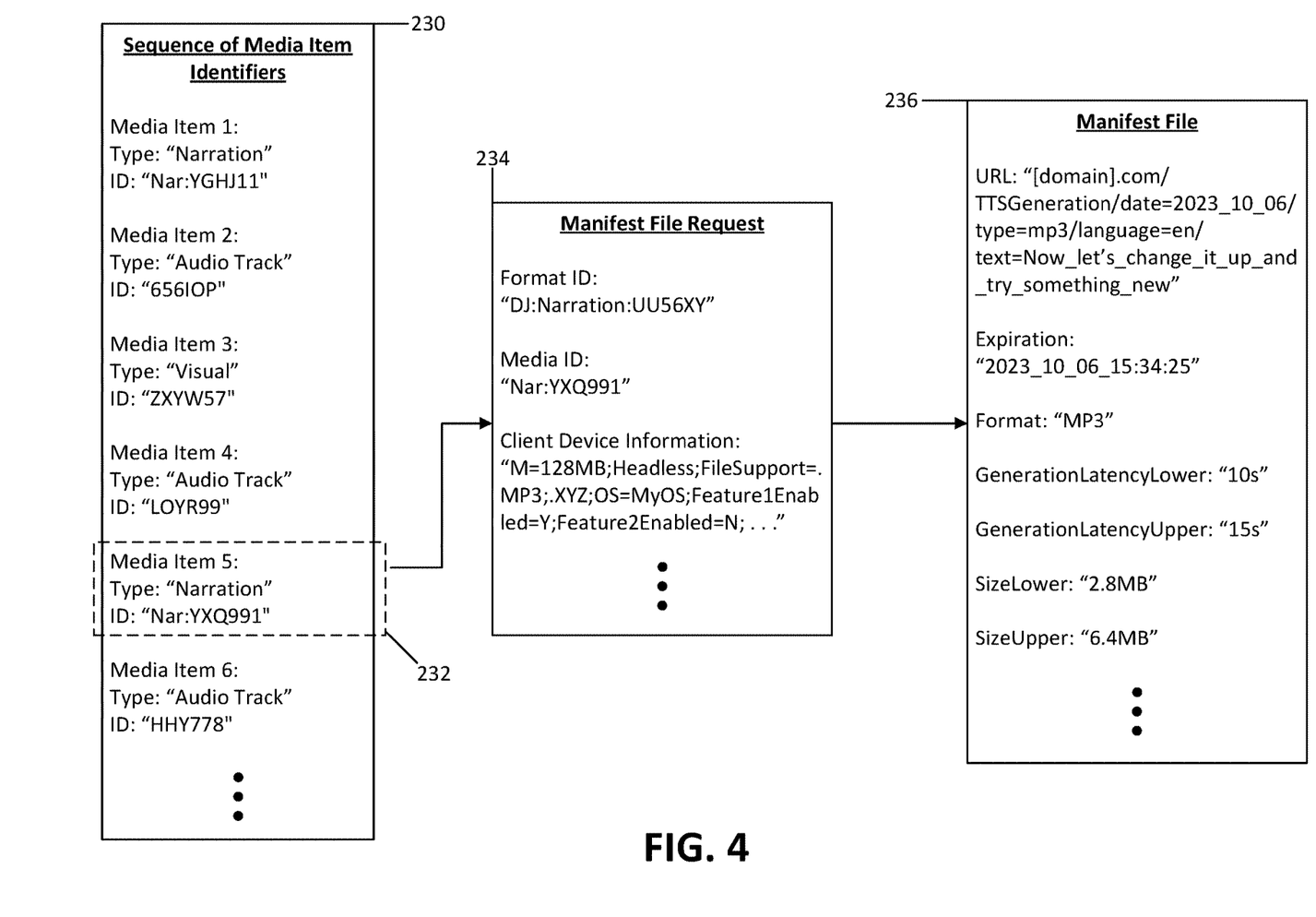
FIG. 4 illustrates a schematic example of data exchanged between computing components.

To make such a request, the playback manager 174 may generate a manifest file request, which may include a format identifier, a media identifier, and client device. In some embodiments, the format identifier may indicate that the request is to be resolved by the DJ sequence provider. The media identifier may include an encoded representation of the narration text. The client device information may include information about the playback device that is to render or play media content associated with the sequence of media item identifiers. An example manifest file request is illustrated in FIG. 4.

At operation 204, the playback manager 174 may provide the manifest file request to the sequence proxy 182. Although the playback manager 174 may provide a plurality of manifest file requests for a plurality of narration media items, the operations 204-216 are described for a single narration media item. At operation 206, the sequence proxy 182 may route—based, for example, on the format identifier—the manifest file request to the DJ sequence provider 192.

At operation 208, the DJ sequence provider 192 may submit the media identifier the text-to-speech URL generator 210 with a request to generate a URL associated with the media identifier. In some embodiments, the DJ sequence provider 192 may extract the encoded narration text from the media identifier and provide the narration text to the text-to-speech URL generator 210. Furthermore, in some embodiments, the DJ sequence provider 192 may provide at least some of the client device information to the text-to-speech URL generator 210.

The text-to-speech URL generator 210 may be configured to receive narration text from the DJ sequence provider 192 and to generate a URL. The URL may be a media item identifier for the narration media item that may be used by a downstream system (e.g., the media player API 112) to retrieve media content (e.g., synthesized speech) for the narration. In some embodiments, the URL may include the narration text as a parameter. Other URL parameters may include the language of the text, a date, a language, a time, a selected DJ voice, or another parameter that may be used as part of synthesizing the narration text. In some embodiments, one or more of the domain or path of the URL may be associated with the CDN 116. In some embodiments, a more general URI may be generated rather than a URL.

In some embodiments, the text-to-speech URL generator 210 may sign the URL. To do so, the text-to-speech URL generator 210 may use a secret key to which only the text-to-speech URL generator 210 has access. By signing the URL, downstream systems, such as the playback manager 174 or the media player API 112 may verify that the URL is, in fact, generated by the text-to-speech URL generator 210. Furthermore, signing the URL may, in some embodiments, ensure that the URL may not be altered. In some embodiments, the signed URL is associated with an expiration time (e.g., a timestamp for 1 minute, 5 minutes, 15 minutes, or another amount of time after which the URL is signed). After the expiration time, the signature may expire and render the URL unusable.

In some embodiments, the text-to-speech URL generator 210 may account for the client device information as part of generating a URL by generating a URL that is associated with media content playable by the client device. For example, if the client device is configured to play data in an MP3 format but not a WAV format, then the text-to-speech URL generator 210 may generate a URL that points to an MP3 file and not a WAV file. As another example, if the client device has limited run-time memory or a poor network connection, then the text-to-speech URL generator 210 may generate a URL for a lower resolution version of a media item rather than a higher resolution or standard version of the media item.

In some embodiments, the text-to-speech URL generator 210 may generate a plurality of URLs for one narration media item. For example, the text-to-speech URL generator 210 may generate a first URL for a high quality (e.g., high fidelity or high resolution) version of a media item and a second URL for a low quality (e.g., low fidelity or low resolution) version of the media item. In such embodiment, the playback manager 174 or the media player API 112 may select from among the provided URLs to retrieve the media content depending, for example, on the network connectivity (e.g., whether connected to the internet via Wi-Fi or cellular data) or other condition related to the client device or the context in which the client device operates.

At operation 212, the text-to-speech URL generator 210 may provide the one or more signed URLs for the narration media item to the DJ sequence provider 192.

The DJ sequence provider 192 may then generate a manifest file for the narration media item. The manifest file may include a signed URL, an expiration timestamp of the URL, a format of the media item, a latency for generating the media item, a size of the media item, and other data related to the media item. The latency for generating the media item may be an estimated value for how long it will take to synthesize the narration text into audio data that may be played. In some embodiments, there may be a range of latency times, such as a lower estimate and a higher estimate. An example manifest file is illustrated below in connection with FIG. 4.

At operation 214, the DJ sequence provider 192 may provide the manifest file to the sequence proxy 182, and at operation 216, the sequence proxy 182 may provide the manifest file to the playback manager 174. Once the playback manager 174 receives the manifest file, then the playback manager 174 may have the information needed for the media player API 112 to play the narration media items and the other media items in the sequence of media items. As shown by the operation 146, the media item identifiers may be provided to the media player API 112, as described above in connection with FIG. 2. In some instances, for a narration media item, a media item identifier (e.g., a URL generated by the text-to-speech URL generator 210) may not be playable by the media player API 112. In such instances, the media item identifier may be provided to a proxy to facilitate communication with the media player API 112, as described below in connection with FIGS. 5-6.

FIG. 4 illustrates example data files described in connection with FIG. 3. FIG. 4 includes a sequence of media item identifiers 230, a manifest file request 234, and a manifest file 236.

The sequence of media item identifiers 230 is an example of media item identifiers selected, generated, or formatted by the DJ sequence provider 192. As described above in connection with FIG. 3, the DJ sequence provider 192 can generate media item identifiers for narration media items that include encoded narration text. Furthermore, as described above the DJ sequence provider 192 can, using the media recommender system 196, generate or access media item identifiers for other media items, such as audio tracks. As described above in connection with the operations 198-202, the DJ sequence provider may return, for example, the sequence of media item identifiers 230 to the playback manager 174.

The playback manager 174 (or the media player API 112) may, in some instances, be unable to use the media item identifier for one or more of the media item identifiers in the sequence of media item identifiers to retrieve media content for the corresponding media item. For example, the playback manager 174 may be unable to use the media item identifier for the media item 232, and as a result, the playback manager 174 may generate the manifest file request 234 and provide the manifest file request to the sequence proxy 182 to retrieve a media item identifier that is usable by the playback manager 174 or the media player API 112.

In the example shown, the manifest file request 234 includes a format ID, a media ID, and client device info. As described above in connection with the operations 202-204, the playback manager 174 may generate the manifest file request 234 and provide it to the DJ sequence provider 192. The format ID may indicate that the sequence proxy 182 is to route the manifest file request 234 to the DJ sequence provider 192, the media ID may include information about the narration text (e.g., encoded information), and the client device information may include information about the client device that is to play the media content associated with the media item 232.

In the example shown, the manifest file 236 may be generated by the DJ sequence provider 192, as described above in connection with FIG. 3. In the example shown, the manifest files include, for the media item 232, a URL, an expiration, a format, a range of generation latency times, and a range of sizes. As described above in connection with the text-to-speech URL generator 210, the URL may include the narration text (e.g., "Now let's change it up and try something new") for the media item 232, which may be a narration related to other media items in the sequence of media item identifiers 230. Another example of narration text may be for example, "That was your favorite track last year. Now let's play something from the Backward Chimp, a new artist I think you will like."

Figure 5:
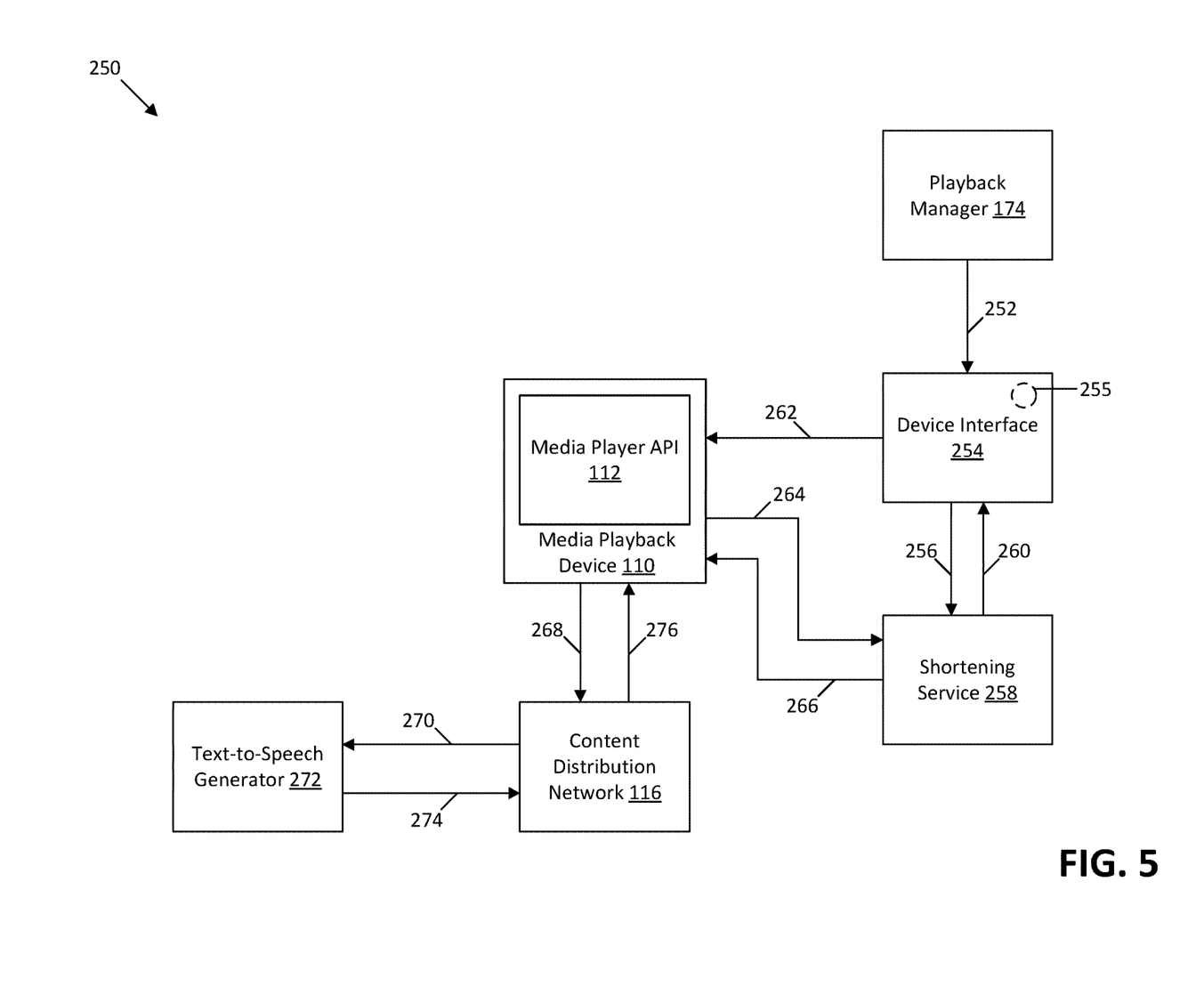
FIG. 5 is a flowchart of an example method including providing a media item identifier to a media playback device and retrieving media content.

FIG. 5 is a flowchart of an example method 250. Operations 252, 255, 256, 260, and 262 illustrate an example for performing aspects of providing media item identifiers for the sequence of media items to the media playback device (operation 146 of FIG. 2). Operations 264, 266, 268, 270, 274, and 276 illustrate an example for performing aspects of requesting media content associated with the media item identifiers (operation 148 of FIG. 2). FIG. 5 further includes the playback manager 174, a device interface 254, shortening service 258, the media playback device 110, the media player API 112, the CDN 116, and a text-to-speech generator 272. In some embodiments, one or more of the playback manager 174, the device interface 254, the shortening service 258, the CDN 116, or the text-to-speech generator 272 may be part of the backend platform 114.

The example of FIG. 5 is described as performed for a single media item. Specifically, the example of FIG. 5 is described as performed for a narration media item. As will be understood by one having skill in the art, aspects of method 250 may be performed for a plurality of media items, including for a plurality of media items that make up a sequence of media items. Depending on the type of media item, however, one or more operations may be removed or added. For example, for an audio track (e.g., a song), the playback manager 174 may, in some instances, provide a media item identifier for the media item to the media playback device 110 without using the shortening service 258, and the CDN 116 may, in some instances, retrieve the media content without using the text-to-speech generator 272.

At operation 252, the playback manager 174 may provide a media item identifier for a media item to the device interface 154. In some embodiments, the media item identifier may be one of a plurality of media identifiers of a sequence of media item identifiers. In some embodiments, the media item identifier is a URL, such as a URL generated by the text-to-speech URL generator 210. In some embodiments, the playback manager 174 may also provide other data to the device interface 254, such as other data from the manifest file, including, for example, client device data.

The device interface 154 may be an interface for interacting with client devices, such as the media playback device 110. In some embodiments, the device interface 254 is configured to interact with internet of things (IoT) devices. In some embodiments, the device interface 254 may be part of the playback manager 174.

At operation 255, the device interface 254 may determine whether the media playback device is compatible with the media item identifier. To do so, the device interface 254 may determine whether the media player API 112 is configured to resolve the media item identifier. As described above in connection with FIG. 1, the media player API 112 may, in some instances, be limited. For example, in some instances, the media player API 112 may only be able to process media items having a length up to a threshold length. Thus, in some embodiments, the device interface 254 may determine a length of the media item identifier received from the playback manager 174. In response to determining that the media item identifier is less than or equal to the threshold length, the device interface 254 may provide the media item identifier to the media playback device 110 (e.g., at the operation 262). In response to determining that the media item identifier is greater than the threshold length, the media item identifier may provide the media item identifier to the shortening service 258 (e.g., at the operation 260).

The shortening service 258 may receive the media item identifier. The shortening service 258 may generate a shortened media item identifier and associate the shortened media item identifier (or a parameter of the shortened media item identifier) with the media item identifier. To do so, the shortening service 258 may store the media item identifier in a database, and to retrieve the media item identifier from the database, the shortened media item identifier (or a parameter of the shortened media item identifier) may be used to look up the media item identifier. As an example, the media item identifier may be a URL. The shortening service 258 may generate a shortened URL that, when followed, leads to the media item identifier stored on the shortening service 258. For example, the domain of the shortened URL may lead to the shortening service 258 and a parameter of the shortened URL may be a key or another lookup value that can be used by the shortening service 258 to retrieve the media item identifier.

At operation 260, the shortening service 258 may provide the shortened media item identifier to the device interface 254, which may, at the operation 262, provide the shortened media item identifier to the media playback device 110.

At operation 264, the media player API 112 may use the shortened media item identifier to retrieve media content for the media item. For example, a method of the media player API 112 may be called with the shortened media item identifier as an input, and the shortened media item identifier may be a URL. In some embodiments, the media player API 112 (or an application that handles HTTP calls) may follow the URL to the shortening service 258. In some embodiments, an HTTP GET method may be used to retrieve information with the URL. Furthermore, as described above, the URL may include a key, hash, or other identifier that is associated with a long media content identifier at the shortening service 258.

The shortening service 258 may receive the call from the media player API 112 at an endpoint. In some embodiments, the shortening service 258 may parse the parameters received from the media player API 112 to retrieve the key, hash, or other identifier that is associated with the media item identifier. Using the key, hash, or other identifier, the shortening service 258 may look up the media content identifier, which may be a URL that is longer than the short media item identifier. In some embodiments, the shortening service 258 may return an HTTP redirect with the URL.

At operation 266, the shortening service 258 may provide the media item identifier to the media playback device 110. In some embodiments, the media item identifier may be a URL that may be received and followed by an application that handles HTTP calls.

At operation 268, the media playback device 110 may retrieve data using the media item identifier. In some embodiments, the media item identifier may be a URL that points to a server or endpoint of the CDN 116. In some embodiments, the media playback device 110 may use an HTTP GET method to retrieve media content from the CDN 116.

The CDN 116 may receive the request for media content from the media playback device 110 and may parse parameters of the request to determine a media content requested by the media playback device 110. In some instances, the CDN 116 may retrieve the requested media content from a database and provide it to the media playback device 110. For example, for some types of media items (e.g., pre-recorded audio files, such as songs), the CDN 116 may retrieve a copy of the media items from a database. Additionally, in some instances, the CDN 116 may have a cache that includes previously retrieved or generated media items. If the requested media item is in the cache, then the CDN 116 may retrieve it from the cache and provide it to the media playback device 110.

In some instances, however, the CDN 116 may generate the media content or call another program to generate the media content. For example, for narration media items, there may not be a file with synthesized speech of the narration text. For example, the speech may not have been pre-recorded or may not have been previously generated.

At operation 270, the CDN 116 may provide a request to the text-to-speech generator 272 to generate the media content for the narration media item. The media content may be a synthesized speech track. The request may include the narration text. The narration text may be received by the CDN 116 as part of the call from the media playback device 110. Furthermore, the request from the CDN 116 to the text-to-speech generator 272 may include parameters regarding how the text is to be synthesized. As an example, the media item identifier used by the media player API 112 to call the CDN 116 may be a URL generated, for example, by the text-to-speech URL generator and may include the narration text and other parameters. The other parameters may include, for example, a language, an audio quality, a file type, a selected voice, or one or more characteristics of the voice to be used, such as a mood, accent, pace, pitch, or other vocal characteristic.

The text-to-speech generator 272 may be a program for generating speech from text. For example, the text-to-speech generator 272 may receive a text input and output an audio file of a spoken version of the text input. In some embodiments, the text-to-speech generator 272 may generate speech that sounds like a predefined voice. In some embodiments, characteristics of the speech may depend at least in part on parameters received from the CDN 116. In some embodiments, the text-to-speech generator 272 includes a machine learning model that receives text as input and outputs audio data. The machine learning model may include a neural network. The machine learning model may be trained using audio data that includes a voice that is to represent a DJ in the DJ feature 104.

At operation 274, the text-to-speech generator 272 may output the audio data to the CDN 116.

At operation 276, the CDN 116 may provide media content to the media playback device 110. The media content may be or may include the audio data received from the text-to-speech generator 272. In some embodiments, the CDN 116 may stream the media content to the media playback device 110. In some embodiments, the media playback device 110 may download the media content from the CDN 116. In some embodiments, the media content may include more media content than the audio data received from the text-to-speech generator 272. For example, the CDN 116 may provide additional audio data retrieved from a database or cache of the CDN 116, the CDN 116 may provide an image that is associated with the synthesized speech received from the text-to-speech generator 272, the CDN 116 may provide text data, or the CDN 116 may provide metadata for the synthesized speech received from the text-to-speech generator 272.

After receiving the media content from the CDN 116, the media playback device 110 may play the media content. For example, the media playback device 110 may use one or more speakers or a display screen to play or render the media content.

Figure 6:
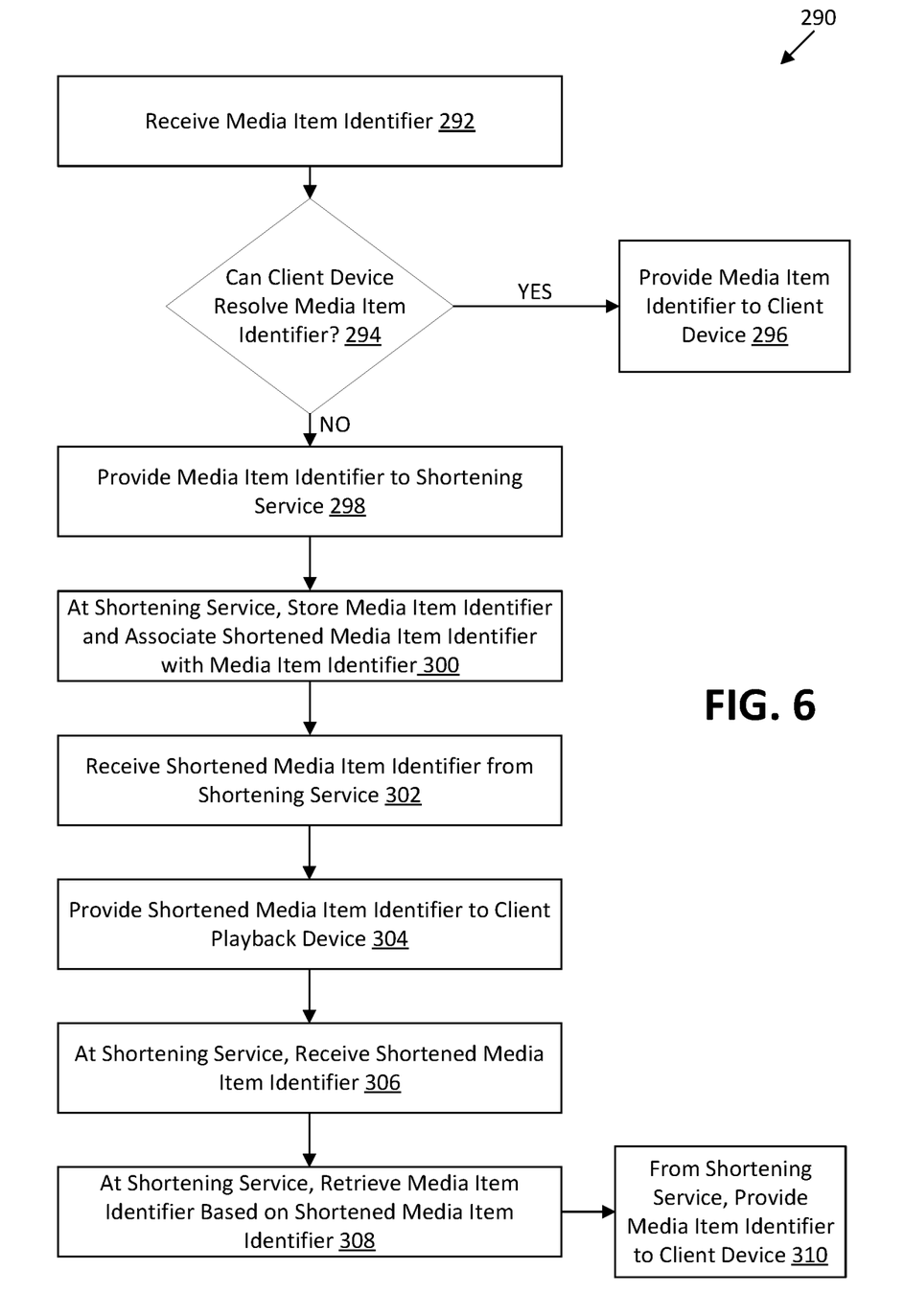
FIG. 6 is a flowchart of an example method including providing a media item identifier to a media playback device.

FIG. 6 is a flowchart of a method 290 for providing a media item identifier to a client device, such as the media playback device 110. The method 290 includes operations and components described above in connection with FIG. 5. Although the method 290 is described in the context of a single media item, operations of the method 290 may be applied, either concurrently or serially, to a plurality of media items, such as a plurality of media items of a sequence of media items to play in connection with the DJ feature 104.

Furthermore, although operations of the method 290 are described as being performed by particular components (e.g., of the backend platform 114), the operations may, depending on the embodiments, be performed by different components and functions of components may overlap. For example, the operations 292-304 are described as being performed by the device interface 254; however, in some embodiments they may be performed by other components, such as the playback manager 174.

At operation 292, the device interface 254 may receive a media item identifier. The media item identifier may be a URL. The media item identifier may be for a media item that is to be played by a client device. The media item identifier may be received from the playback manager 174. The device interface 254 may receive the media item identifier as part of a request to push the media item identifier to the client device. The device interface 254 may also, in some embodiments, receive other data as part of the request, such as client device capabilities or one or more different media item identifiers (e.g., a plurality of URLs), as described above in connection with FIG. 5.

At decision 294, the device interface 254 may determine whether the client device is compatible with the media item identifier. For example, the device interface 254 may determine whether the client device is configured to resolve the media item identifier. To do so, the device interface 254 may determine compatibility information based, for example, on information received from the playback manager 174. For example, the device interface 254 may determine whether the client device is configured to process the media item identifier so that media content for the media item can be retrieved by using the media item identifier. To make this determination, the device interface 254 may use the information received from the playback manager 174 regarding the client device. As described above, one example restriction may be that the media player API 112 on the client device cannot receive, as input, a media item identifier over a certain length. In response to determining that the client device can resolve the media item identifier (e.g., taking the "YES" branch), the device interface 254 may provide the media item identifier to the client device (e.g., at operation 296), which may use the media item identifier to retrieve media content associated with the media item, as described above in connection with FIG. 5. In response to determining that the client device cannot resolve the media item identifier (e.g., taking the "NO") branch, the device interface 254 may provide the media item identifier to the shortening service 258 (e.g., at operation 298).

At operation 300, the shortening service 258 may receive the media item identifier from the device interface 254 and store the media item identifier. Furthermore, as described above in connection with FIG. 5, the shortening service 258 may generate a shortened media item identifier that includes a key, hash, or other identifier that may be used to retrieve the stored media item identifier, and the shortening service 258 may return the shortened media item identifier to the device interface 254. The shortened media item identifier may be a URL that, when used in an HTTP method, results in a call to an endpoint of the shortening service 258. In some embodiments, the shortening service 258 may receive a plurality of media item identifiers from the device interface 254, and the shortening service may, for each media item identifier of the plurality of media item identifiers, create an associated shortened media item identifier.

At operation 302, the device interface 254 may receive the shortened media item identifier from the shortening service 258.

At operation 304, the device interface 254 may provide the shortened media item identifier to the client device. As part of doing so, the device interface 254 may provide a command to retrieve and play the media item associated with the shortened media item identifier. Furthermore, the device interface 254 may include one or more other parameters as part of providing the shortened media item identifier to the client device, such as a time at which to play the media item or, for a plurality of media items, an ordered sequence in which to play the media items.

At operation 306, the shortening service 258 may receive a request from the client device. The request may include the shortened media item identifier or a parameter of the media of the media item identifier.

At operation 308, the shortening service 258 may retrieve the stored media item identifier. Because the shortened media item identifier (or a part or parameter of the shortened media item identifier) is associated with the media item identifier (e.g., as a key, hash, or other identifier), the shortening service 258 may use the shortened media item identifier to look up the media item identifier in a database.

At operation 310, the shortening service 258 may provide the media item identifier to the client device. In some embodiments, the shortening service 258 may provide the media item identifier to the client device as part of an HTTP redirect. The client device may then use the media item identifier to retrieve media content, as described above in connection with FIG. 5.

Figure 7:
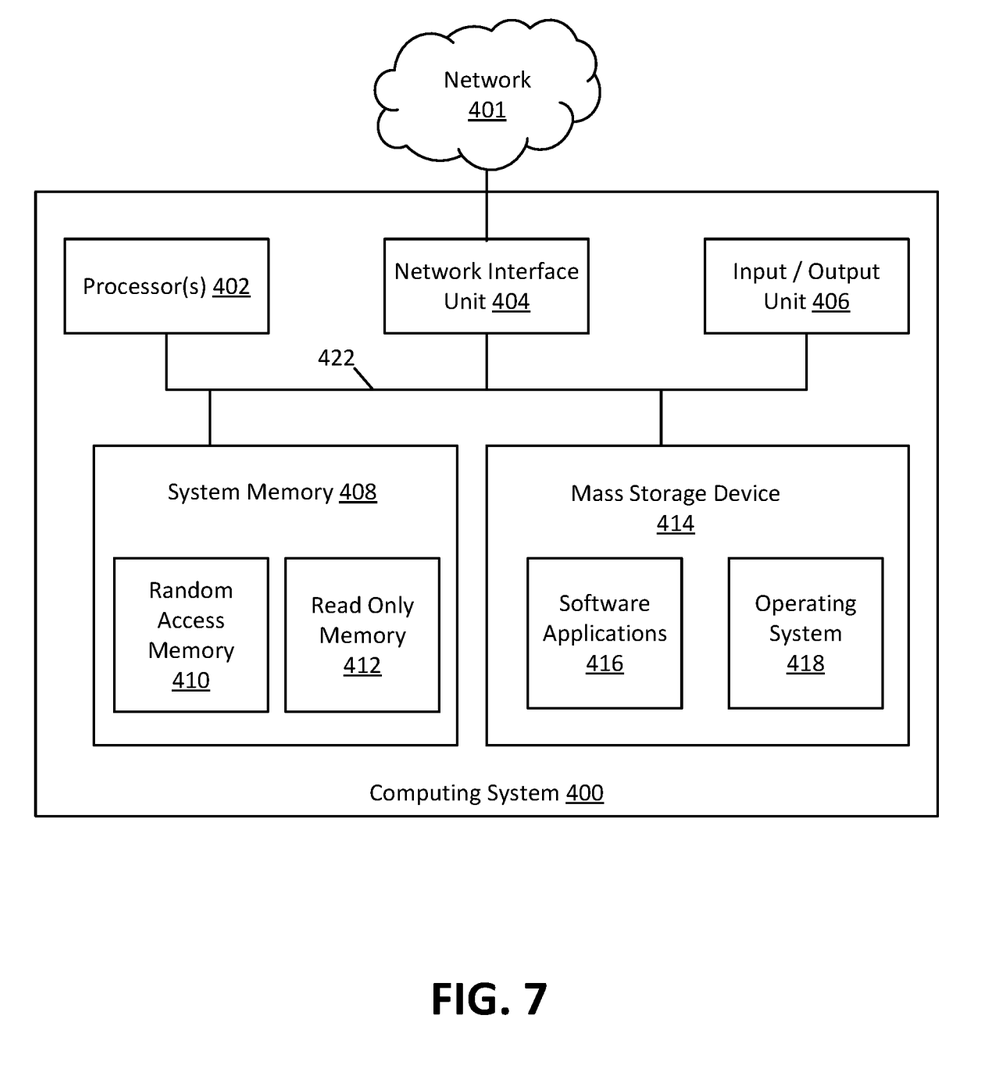
FIG. 7 illustrates a block diagram of an example computing system.

FIG. 7 illustrates an example block diagram of a virtual or physical computing system 400. One or more aspects of the computing system 400 can be used to implement the system, components, and processes described herein.

In the embodiment shown, the computing system 400 includes one or more processors 402, a system memory 408, and a system bus 422 that couples the system memory 408 to the one or more processors 402. The system memory 408 includes RAM (Random Access Memory) 410 and ROM (Read-Only Memory) 412. A basic input/output system that contains the basic routines that help to transfer information between elements within the computing system 400, such as during startup, is stored in the ROM 412. The computing system 400 further includes a mass storage device 414. The mass storage device 414 is able to store software instructions and data. The one or more processors 402 can be one or more central processing units or other processors.

The mass storage device 414 is connected to the one or more processors 402 through a mass storage controller (not shown) connected to the system bus 422. The mass storage device 414 and its associated computer-readable data storage media provide non-volatile, non-transitory storage for the computing system 400. Although the description of computer-readable data storage media contained herein refers to a mass storage device, such as a hard disk or solid-state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 400.

According to various embodiments of the invention, the computing system 400 may operate in a networked environment using logical connections to remote network devices through the network 401. The network 401 is a computer network, such as an enterprise intranet and/or the Internet. The network 401 can include a LAN, a Wide Area Network (WAN), the internet, wireless transmission mediums, wired transmission mediums, other networks, and combinations thereof. The computing system 400 may connect to the network 401 through a network interface unit 404 connected to the system bus 422. It should be appreciated that the network interface unit 404 may also be utilized to connect to other types of networks and remote computing systems. The computing system 400 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing system 400 can store software instructions and data. The software instructions include an operating system 418 suitable for controlling the operation of the computing system 400. The mass storage device 414 and/or the RAM 410 also store software instructions, that when executed by the one or more processors 402, cause one or more of the systems, devices, or components described herein to provide functionality described herein. For example, the mass storage device 414 and/or the RAM 410 can store software instructions that, when executed by the one or more processors 402, cause the computing system 400 to receive and execute managing network access control and build system processes.

Aspects of the present disclosure provide various technical benefits. In example embodiments, a client device may receive a media item identifier (e.g., a URL) that includes narration text, and then the client device may call a content distribution network to generate synthesized speech for the narration text. However, because the narration text is generated by a backend platform that is not accessible to the client, and because the URL may be signed and have an expiration time, the client may be unable to alter the text that is to be spoken. Thus, the architecture of the present disclosure utilizes external distributed computing systems without comprising control of how a text-to-speech generator may be used.

Yet still, in example embodiments, aspects of the present disclosure enable playback of a sequence of media items that may include a generated narration of other items in the sequence of media items. The selection of media items, the selection of narration text, and the generation of narration speech may be dynamically performed in response to a user request. As a result, each of the media items may be customized to a user that submitted the request and the narration text may be customized to the selected media items and the user. Furthermore, the sequence of media items may include different types of media, such as a combination of music tracks, narration media items, and other media items.

Yet still, in example embodiments, the selection, generation, and playback of a sequence of media item with a narration media item may be enabled on disparate device types, ranging from personal computers and smartphones to ubiquity devices such as a speaker or television that may have different available computational resources and software. Furthermore, in some embodiments, for legacy devices, backend services may ensure that media item identifiers provided to the legacy devices may be handled without needing to alter software or hardware of the legacy devices.

While particular uses of the technology have been illustrated and discussed above, the disclosed technology can be used with a variety of data structures and processes in accordance with many examples of the technology. The above discussion is not meant to suggest that the disclosed technology is only suitable for implementation with the components and operations shown and described above.

This disclosure described some aspects of the present technology with reference to the accompanying drawings, in which only some of the possible aspects were shown. Other aspects can, however, be embodied in different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method of generating synthesized speech, the method comprising:
    receiving a playback request from a media controller device;
    identifying a plurality of media items for playback in response to the playback request, the plurality of media items including at least a media track and a narration media item associated with the media track;
    determining a media item identifier for the narration media item, the media item identifier having a length;
    determining compatibility information for a media playback device;
    using the compatibility information, determining whether the media playback device is compatible with the media item identifier;
    in response to determining that the media playback device is not compatible with the media item identifier, sending the media item identifier to a shortening service to generate a shortened media item identifier that has a length that is shorter than the length of the media item identifier;
    sending the shortened media item identifier to the media playback device;
    at the shortening service, receiving a parameter of the shortened media item identifier from the media playback device;
    at the shortening service, retrieving the media item identifier using the parameter of the shortened media item identifier;
    providing, from the shortening service, the media item identifier to the media playback device; and
    using the media item identifier, requesting, from the media playback device, a synthesized speech track for playback of the narration media item.

2. The method of claim 1,
    wherein the compatibility information specifies a maximum length of a media item identifier that can be accepted by a media player application programming interface of the media playback device; and
    wherein determining whether the media playback device is compatible with the media item identifier comprises determining whether the length of the media item identifier exceeds the maximum length.

3. The method of claim 2, wherein the maximum length is 256 bytes.

4. The method of claim 2, further comprising, after sending the shortened media item identifier to the media playback device:
    at the media playback device, inputting the shortened media item identifier into the media player application programming interface to follow the shortened media item identifier to the shortening service; and
    receiving, at the media playback device, a redirect from the shortening service including the media item identifier.

5. The method of claim 4, wherein the redirect is handled by an HTTP application on the media playback device without providing the media item identifier to the media player application programming interface.

6. The method of claim 1, further comprising:
    determining whether the media item identifier exceeds a threshold length; and
    sending the media item identifier to the shortening service when determined that the media item identifier exceeds the threshold length; and
    sending the media item identifier to the media playback device when determined that the media item identifier does not exceed the threshold length.

7. The method of claim 1, wherein the media item identifier includes at least: (i) a narration text to be spoken by a synthetic voice; (ii) a date; and (iii) a language to be spoken by the synthetic voice.

8. The method of claim 1, wherein the media item identifier comprises a uniform resource identifier or a uniform resource locator.

9. The method of claim 1, further comprising:
    determining a second media item identifier for the media track;
    using the compatibility information, determining that the media playback device is compatible with the second media item;
    in response to determining that the media playback device is compatible with the second media item, providing the second media item identifier to the media playback device without using the shortening service.

10. The method of claim 1, wherein the media controller device and the media playback device are a same device.

11. The method of claim 1,
    wherein the playback request includes a playlist identifier;
    wherein identifying the plurality of media items for playback comprises using the playlist identifier; and
    wherein identifying the plurality of media items for playback comprises:
        providing data from the playback request to a media recommender system;
        receiving from the media recommender system, an identification of the media track; and
        based in part on characteristics of the media track, generating narration text for the narration media item.

12. The method of claim 1, wherein the plurality of media items includes an ordered sequence of media items for playback, the ordered sequence of media items for playback including the narration media item followed by the media track.

13. The method of claim 1, wherein the shortened media item identifier is a uniform resource identifier including the parameter or a uniform resource locator including the parameter.

14. The method of claim 1, wherein the parameter is an alphanumeric string associated with the media item identifier in a database of the shortening service.

15. The method of claim 1,
wherein determining the media item identifier for the narration media item comprises determining a plurality of media item identifiers for the narration media item, the plurality of media item identifiers including a first identifier for a first version of the narration media item and second identifier for a second version of the narration media item;
wherein each of the first version of the narration media item and the second version of the narration media item have a same narration text; and
wherein the first version of the narration media item has a higher audio quality than the second version of the narration media item.

16. A system for generating synthesized speech, the system comprising:
a media playback device;
a playback manager;
a DJ sequence provider; and
a shortening service;
wherein the playback manager is configured to receive a playback request including a playlist identifier and compatibility information of the media playback device;
wherein the DJ sequence provider is configured to, based in part on the playlist identifier, identify a plurality of media items for playback including at least a media track and a narration media item associated with the media track;
wherein the playback manager is further configured to:
determine a media item identifier for the narration media item, the media item identifier having a length;
using the compatibility information, determine whether the media playback device is compatible with the media item identifier;
in response to determining that the media playback device is not compatible with the media item identifier, send the media item identifier to the shortening service to generate a shortened media item identifier that has a length that is shorter than the length of the media item identifier; and
send the shortened media item identifier to the media playback device;
wherein the shortening service is configured to:
receive a parameter of the shortened media item identifier from the media playback device;
retrieve the media item identifier using the parameter of the shortened media item identifier; and
provide the media item identifier to the media playback device;
wherein the media playback device is configured to request, using the media item identifier a synthesized speech track for playback of the narration media item.

17. The system of claim 16, further comprising:
a content distribution network; and
a text-to-speech generator;
wherein the content distribution network is configured to, in response to the request for the synthesized speech track from the media playback device:
parse narration text for the narration media item from the media item identifier;
provide the narration text to the text-to-speech generator to generate the synthesized speech track.

18. The system of claim 16, further comprising a media controller device different from the media playback device, the media controller device configured to provide the playback request to the playback manager in response to a selection of a DJ feature of a client application installed on the media controller device.

19. The system of 16, wherein the media playback device includes a media player application programming interface including a function defined to play a media item using an output device of the media playback device and defined to receive, as input, an identifier having length less than or equal to 256 bytes.

20. A platform for facilitating playback of a narration media item and a media track, the platform comprising:
a processor; and
memory, the memory storing instructions that, when executed by the processor, cause the platform to:
receive a playback request from a media controller device, the playback request including a playlist identifier and compatibility information of a media playback device;
identify a plurality of media items for playback in response to the playback request, the plurality of media items including at least the media track and the narration media item associated with the media track;
determine a media item identifier for the narration media item, the media item identifier having a length;
use the compatibility information, determine whether the media playback device is compatible with the media item identifier;
in response to determining that the media playback device is not compatible with the media item identifier, send the media item identifier to a shortening service to generate a shortened media item identifier that has a length that is shorter than the length of the media item identifier;
send the shortened media item identifier to the media playback device;
receive a parameter of the shortened media item identifier from the media playback device;
retrieve the media item identifier using the parameter of the shortened media item identifier; and
provide the media item identifier to the media playback device.

* * * * *